United States Patent [19]

Fujiki

[11] 4,191,460
[45] Mar. 4, 1980

[54] CAMERA WITH AUTOMATIC FOCUS ADJUSTMENT DEVICE

[75] Inventor: Makoto Fujiki, Tokyo, Japan

[73] Assignee: Canon Kabushiki Kaisha, Tokyo, Japan

[21] Appl. No.: 962,884

[22] Filed: Nov. 22, 1978

[30] Foreign Application Priority Data

Dec. 14, 1977 [JP] Japan .................. 52-150340

[51] Int. Cl.² ............................................. G03B 3/10
[52] U.S. Cl. ..................................... 354/25; 352/140; 354/198
[58] Field of Search ..................... 354/25, 195, 198; 352/140; 358/227

[56] References Cited
U.S. PATENT DOCUMENTS

3,972,056   7/1976   Tsujimoto et al. .............. 352/140 X

Primary Examiner—Michael L. Gellner
Attorney, Agent, or Firm—Toren, McGeady and Stanger

[57] ABSTRACT

A camera having a zoom lens with a focusing range changeover device for selectively permitting photography in either one of the ordinary zoom and macro-zoom modes. An automatic focus adjustment is effected by measuring a distance from the camera to an object to be photographed through an optical system outside the zoom lens. When the camera is switched by the changeover device from the ordinary zoom mode to the macro-zoom mode, the automatic focus adjustment device is excluded automatically, or the film winding and shutter cocking mechanism are caused to be simultaneously inoperative. Upon movement of a knob from the autofocusing position, the mechanism is caused to be operative with manual focusing to thereby avoid reduction of image sharpness due to the parallax error which is greatly increased in macro-photography.

33 Claims, 11 Drawing Figures

CAMERA WITH AUTOMATIC FOCUS ADJUSTMENT DEVICE

BACKGROUND OF THE INVENTION

1. Field of the Invention

This invention relates to photographic cameras having automatic and manual ranges of focusing control.

2. Description of the Prior Art

Many methods for automatically focusing a still or movie camera by controlling the position of the objective lens system in accordance with the photo-electrically sensed distance from the camera to an object to be photographed have been proposed. The distance metering aspect of the autofocusing device may be operated in a through-the-lens metering mode (TTL), such as, for example, disclosed in U.S. Pat. No. 3,972,056. In that patent, the objective lens system is utilized as a part of the distance metering optical system so that a fraction of the light passing through the objective lens contributes to the detection of the condition of sharp focus. Another possibility for distance metering is in an outside-the-lens metering mode (OTL) disclosed, for example, in U.S. Pat. Nos. 3,836,772 and 3,838,275. There, a distance metering optical system is provided which is entirely independent of the objective lens system to effect an equivalent result.

While the camera employing the TTL type autofocusing device is, because of its use of light entering through the objective lens along the optical axis thereof in measuring the distance, capable of maintaining the accuracy of focusing control independently of the camera-to-object distance and, in a theoretical sense, of realizing the condition of best focus over the entire focusing range from infinity to an extreme close-up, the accuracy of the latter type autofocusing device is adversely affected by the parallax between the optical axes of the distance metering and photo-taking systems. This is because the focusing control error due to the parallax is greatly increased when in close-ups.

In the market, however, there is a strong demand for cameras capable of focusing down to extremely short distances with close-up effect. To meet this demand, particularly in the cinematographic camera, the photo-taking optical system is constructed in the form of a zoom lens provided with not only the commonly accepted zoom range but also a macro-zoom range in order to permit making closer close-ups. In providing focusing in these two zoom ranges, it has been a common practice to operate a changeover device. With the camera having the macrozoom range in combination with the OTL type autofocusing device, however, the motion picture photography can be made only in the ordinary zoom range where the parallax is negligible in measuring the camera-to-object distance. A camera having the function of making motion picture photography with high accuracy of focusing control in both the ordinary zoom and macro-zoom ranges is not known to date.

SUMMARY OF THE INVENTION

A first object of the present invention is to provide an autofocusing camera having the outside-the-lens type distance metering optical system with which a photo-taking optical system having a function of making closer close-ups can be used without causing reduction of the accuracy of focusing control.

A second object of the present invention is to provide a camera having a photo-taking optical system in the form of a zoom lens provided with ordinary zoom and macro-ranges which are selectively rendered operative by a range changeover device, and having an outside-the-lens distance metering type autofocusing device arranged to be excluded from the driving of the zoom lens in automatic response to the selection of the macro-zoom range.

A third object of the present invention is to provide a camera of the character described having a display device for informing the camera operator of the fact that the aforesaid autofocusing device is excluded from performing photography in the macro-zoom range.

A fourth object of the present invention is to provide a camera of the character described in which the warning display can be viewed in the field of a finder.

A fifth object of the present invention is to provide an autofocusing camera having a zoom lens of the character described and provided with an automatic and manual focusing mode selector cooperative with a camera release control device in such a manner that when the selection of the automatic focusing mode for effective operation of the outside-the-lens distance metering type autofocusing device has simultaneously occurred with the selection of the macro-zoom range by the range changeover device, the release control device automatically is no longer effective to actuate the camera, and that when the focusing mode is changed to the manual one to exclude the autofocusing device, the release of the camera can be actuated again to perform photography in the macro-zoom range.

A sixth object of the present invention is to provide a camera of the character described in connection with the fifth object so as to be provided with a warning display device for informing the camera operator of the fact that the release control device is set in the ineffective position.

A seventh object of the present invention is to provide a camera of the character described immediately above in which the warning display is visible in the field of view of a finder.

In accordance with the invention, a camera comprises a zoom lens mechanical mounting capable of selectively photographing in an ordinary zoom range and a macro-zoom range, photographing range changeover means for changing over the zoom range of the zoom lens mechanical mounting and automatic focus adjustment means for automatically controlling focus adjustment of the zoom lens in accordance with a distance from the camera to an object to be photographed. The automatic focus adjustment means includes a distance measuring optical system having an optical axis offset from that of the zoom lens and a focus adjusting device for detecting the camera-to-object distance by an incident light beam from the distance metering optical system and for performing focus adjustment of the zoom lens. Also included in the camera are drive means for driving the camera and control means responsive to changeover operation by the changeover means to the macro-zoom range for rendering the drive means inoperative.

For a better understanding of the present invention, reference is made to the following description and accompanying drawings, while the scope of the present invention will be pointed out in the appended claims.

DESCRIPTION OF THE PREFERRED EMBODIMENTS

Figure 1:
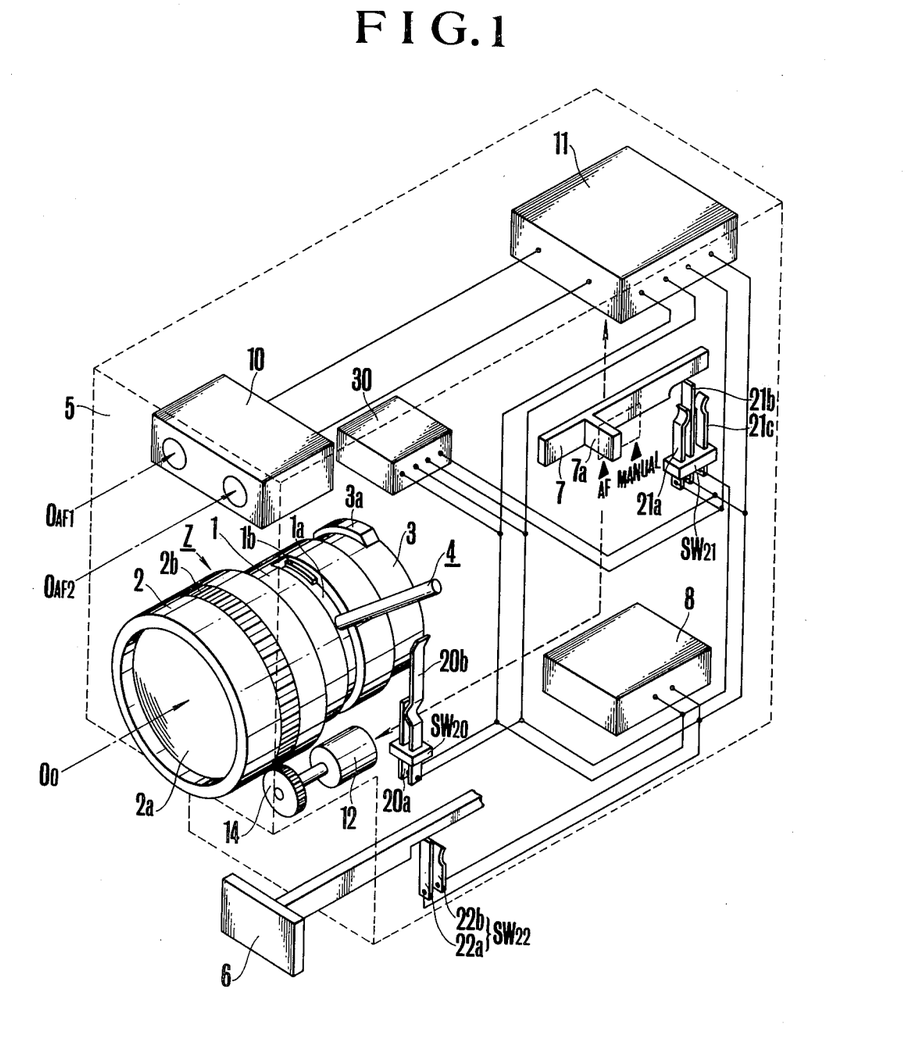
FIG. 1 is a partially schematic perspective view of one embodiment of an actuation control system for an autofocusing device according to the present invention applied to a cinematographic camera having an objective lens of the zoom type provided with ordinary zoom and macro-zoom ranges.

Referring to FIGS. 1 to 5, there is shown one embodiment of the present invention. In FIG. 1, a mounting mechanism Z for the zoom lens includes a main tubular body 1 fixedly secured to a camera housing 5. Rotatably and axially movably mounted on the front end of the tube 1 is a distance adjusting ring 2 in which a focusing member 2a of the zoom lens is fitted. A cam sleeve 3 for controlling axial movement of zoom control members of the lens is rotatably fitted in the rear end of the tube 1, and has an operating member radially extending therefrom through and outwardly beyond a circumferential slot 1a provided through the wall of the tube 1. This operating member 4 is constructed as shown in FIG. 2 to serve as a range changeover device.

Figure 2A:
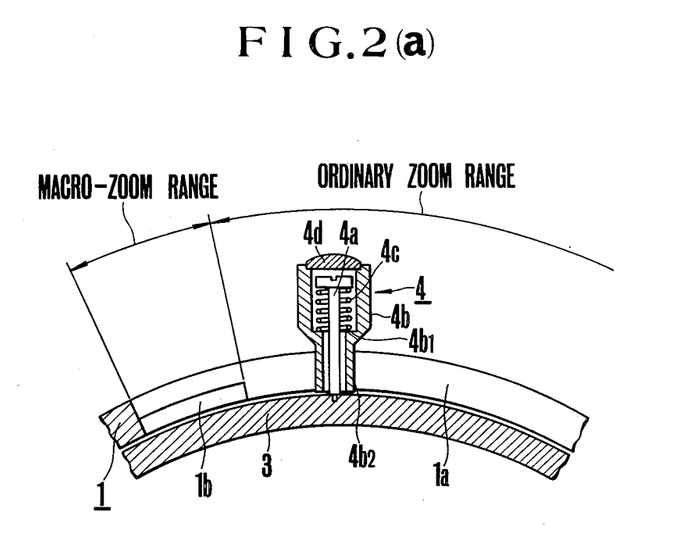
FIGS. 2(a) and 2(b) are fragmentary sectional views of a range changeover device of FIG. 1 when set in the ordinary zoom and macro-zoom ranges respectively.
Figure 2B:
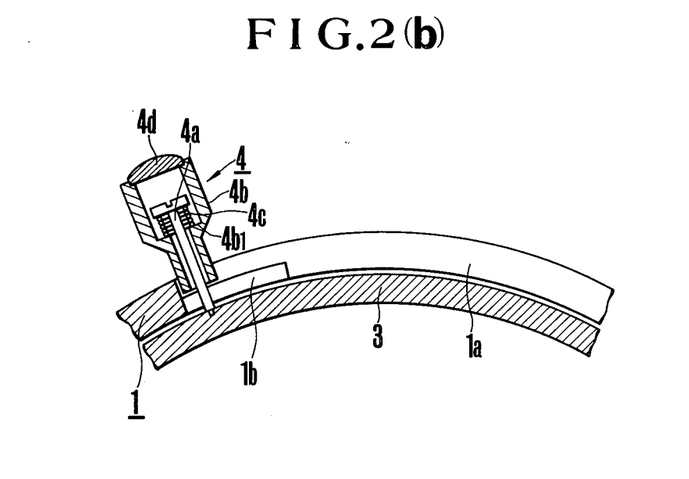

The range changeover device comprises a headed shaft 4a fixedly planted on the cam sleeve 3 in normal relation thereto, an actuating tube 4b movably mounted around the shaft 4a and which is stepped down to form an upwardly facing internal annular shoulder 4b1, and a compressed spring 4c disposed between the shaft head and the shoulder upon contact at its bottom end with the cam sleeve 3 as shown in FIG. 2(a). The range changeover device operates to limit the range of rotation of the cam sleeve 3 for the ordinary zoom range by cooperation with abutment lugs 1b formed on the circumferential slot 1a at either end thereof. To achieve a change from the ordinary zoom to the macro-zoom range, the operator first needs to lift up the actuating tube 4b against the force of the spring 4c and then to swing it in either direction until the shaft 4a enters a space between the front wall of the slot 1a and the abutment lug 1b and then to remove his fingers from lifting up the actuating tube 1b so that the cam sleeve 3 is restrained from accidental movement by the spring 4c at a desired point within the macro-zoom range as shown in FIG. 2(b). The reverse change to the ordinary zoom range can be simply effected by moving the device 4 away from the end of the slot 1a.

Figure 4A:
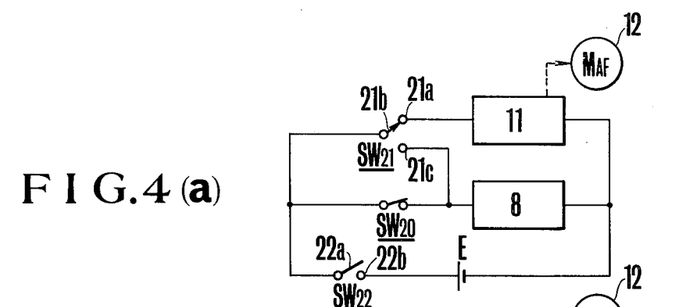
FIGS. 4(a), 4(b) and 4(c) are an electrical circuit diagram of the actuation control system in three different operative positions.
Figures 4B, 4C:
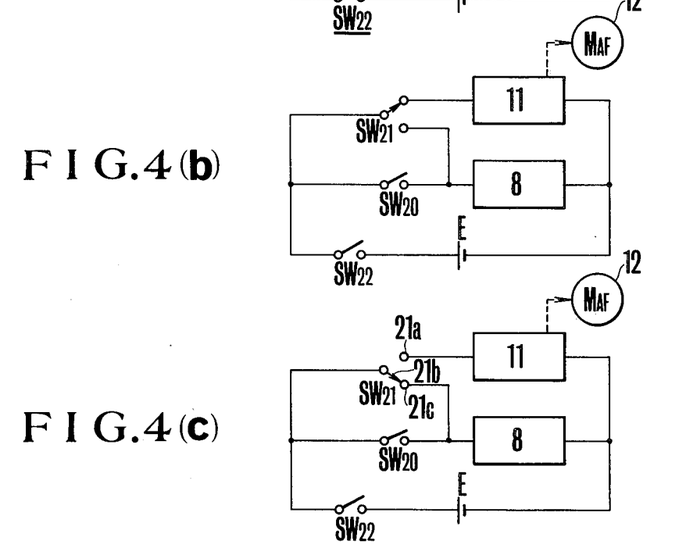
Figure 5:
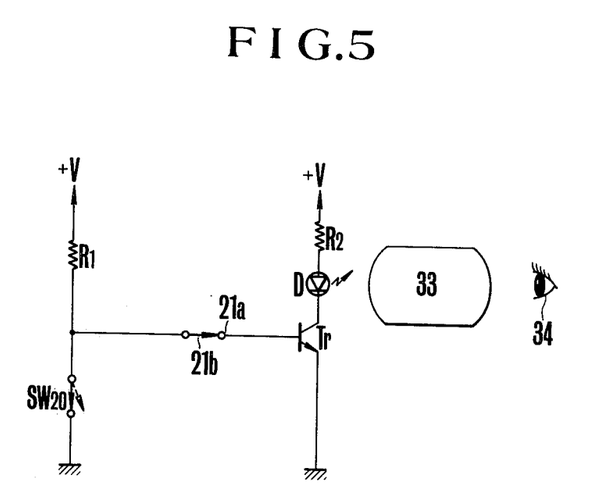
FIG. 5 is a schematic circuit diagram of a warning display device as positioned in a finder of the camera.

Turning again to FIG. 1, the camera further includes a release member 6 projected outwardly of the camera housing 5 at the front lowermost portion thereof by a spring (not shown), a sliding switchable control knob 7 for selection of automatic and manual focusing modes designated by respective symbols "AF" and "MANUAL" on the housing 5, a drive mechanism 8 for moving a filmstrip (not shown) behind the zoom lens Z and for rotating a shutter (not shown), a distance metering optical system 10 having two optical axis OAF1 and OAF2 to and offset from the optical axis Oo of the zoom lens Z, a signal processor 11 responsive to the output signal of the distance metering optical system 10 for controlling operation of a servo motor 12, the output shaft of the motor 12 having a gear 14 affixed thereto, and the gear 14 meshing with a geared portion 2b of the distance adjusting ring 2, and a finder optical system 30 including a warning display device to be described later in connection with FIG. 5. The parts 10, 11, 12 and 14 constitute an automatic focus adjustment device known in the art as, for example, in U.S. Pat. No. 3,838,275. A coordination control circuit for such autofocusing device and the drive source 8 comprises three switches SW20, SW21 and SW22 arranged as shown in FIG. 1 and connected to each other and to the parts 8, 11 and a battery E as shown in FIGS. 4(a), 4(b) and 4(c).

Figure 3A:
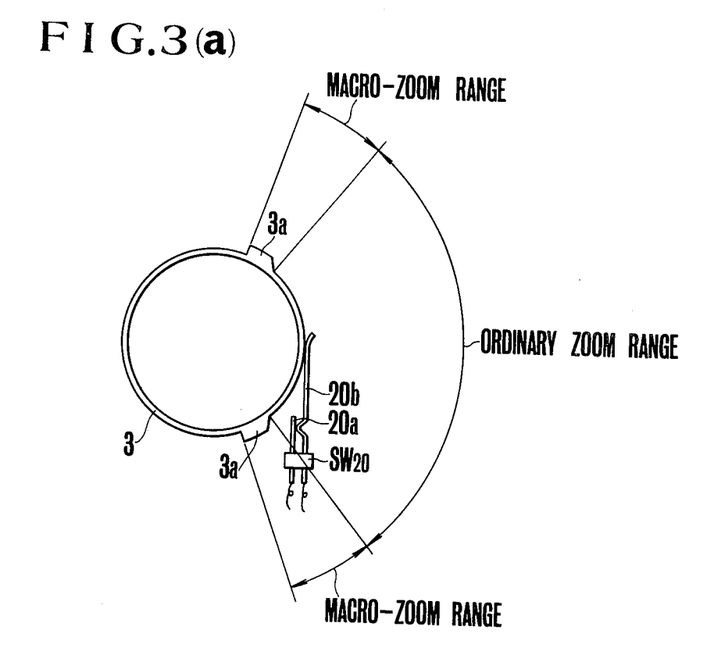
FIGS. 3(a) and 3(b) are an elevational views showing an arrangement of an electrical power supply control switch for a film feeding and shutter driving mechanism adjacent a zoom control ring.

When the zoom control member 4 is located in the ordinary zoom range, either of two cam lobes 3a on the zoom control sleeve 3 is moved away from a movable contact 20b of the switch SW20 as shown in FIG. 3(a), causing the movable contact 20b to be electrically connected with a fixed contact 20a. When the focusing mode selector slide 7 is moved to the left with its knob 7a placed in registry with the symbol "AF", a movable contact 21b of the switch SW21 is electrically connected with a fixed contact 21a so that the signal processor 11 is ready for electrical power supply from the battery E, as shown in FIG. 4(a). In this state, the depression of the release member 6 for closure of the switch SW22 leads to a motion picture operation while permitting the zoom lens Z to be zoomed in the ordinary range by the member 4 with automatic focus adjustment.

Figure 3B:
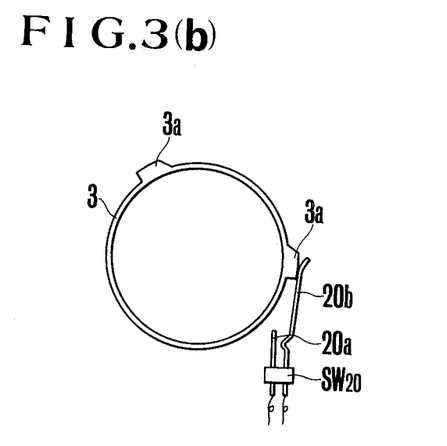

If the operating member 4 is moved from the ordinary zoom to the macro-zoom position, the switch SW20 is opened by the cam lobe 3a as shown in FIGS. 3(b) and 4(b) to cut off the drive source 8 from the electrical power supply. At this time, the autofocusing device remains operative. The reason why the driving of the camera is stopped when the macro-zoom range is rendered operative is that the distance metering aspect of the autofocusing device is operated in the outside-the-lens metering mode to admit the introduction of the above-mentioned parallax error into the accuracy of focusing control. In a camera having the outside-the-lens distance metering type autofocusing device and adapted to employ an objective lens having the ordinary zoom and macro-zoom ranges, however, there must be provided a means for enabling the motion picture operation to be performed even when in the macro-zoom range, or otherwise the provision of the macro-zoom range would become meaningless. According to the present invention, therefore, the movable and fixed contacts 21b and 21c of the switch SW21 are connected across the switch SW20 so that when the stoppage of the drive source 8 is followed by the movement of the control slide 7 to the right until the knob 7a is placed in registry with the symbol "MANUAL", the depression of the release member 6 becomes effective again to take motion picture photography with manual adjustment of focusing, since the signal processor 11 is cut off from the battery E as shown in FIG. 4(c). In other words, the macro-zoom range is rendered operative only by the change from the automatic to the manual focusing mode.

It will be appreciated that the camera equipped with the outside-the-lens distance metering type autofocusing device in accordance with the present invention shown in FIGS. 1 to 4 encompasses the use of the range changeover device in combination with the focusing mode selector to assure that the condition of sufficiently sharp focus is realized even in the macro-zoom range since the autofocusing device is excluded from the focusing ring in automatic response to the change from the ordinary zoom to the macro-zoom range. Thus, the presence of the parallax between the photo-taking and distance metering optical systems has no adverse effect on the focusing control.

With the camera of FIGS. 1 to 4, when it happens that the operator is not aware of the simultaneous occurrence of the settings of the range changeover device 4 and the control slide 7 in the macro-zoom range and automatic focusing mode respectively, the later depression of the release member 6 will no longer be effective to actuate the camera. In this case, the operator may perhaps mistake the phenomenon for a damage. To avoid this, a warning device is provided as shown in FIG. 5. This device comprises a display element or light-emitting diode D positioned adjacent a finder optical system 33, a switching transistor Tr with a collector connected to the cathode of the diode D, with an emitter grounded and with a base connected to the fixed contact 21a, a first resistor R1 connected between a voltage source +V and a junction point between the movable contacts 21a and 20b of the switches SW21 and SW20, and a second resistor R2 connected between the diode D and the voltage source +V. When the operating member 4 is set in the macro-zoom range where the switch SW20 is open and when the slide 7 is set in "AF" position where the movable contact 21b is in contact with the fixed contact 21a, the transistor Tr is rendered conducting to energize the light-emitting diode D, thereby the operator looking through the finder 33 is informed of the fact that the camera is protected from defocusing of the zoom lens Z.

Figure 6:
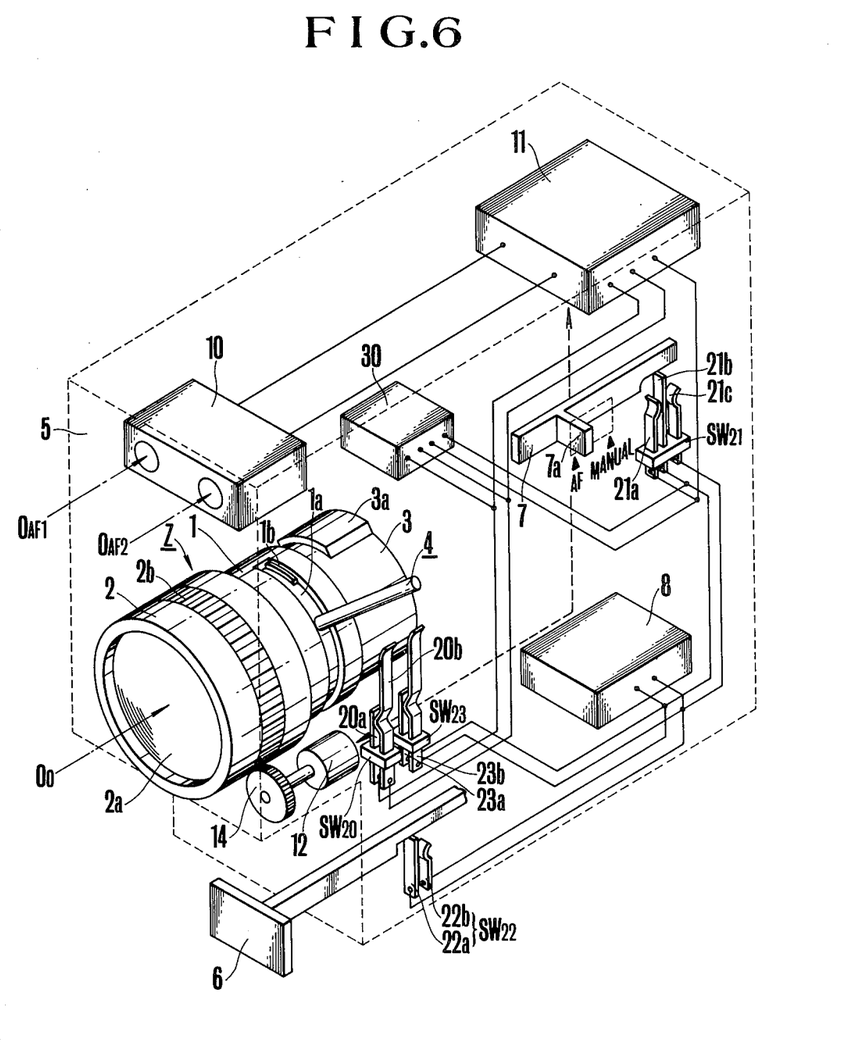
FIG. 6 is a similar view to that of FIG. 1 showing another embodiment of the present invention.
Figure 7:
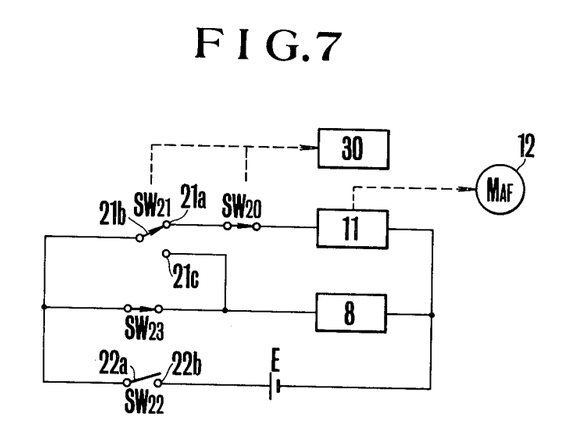
FIG. 7 is an electrical circuit diagram of the actuation control system of FIG. 6.

FIGS. 6 and 7 show another embodiment of the present invention as modified from the camera of FIGS. 1 to 5, particularly in the signal input means of the warning device. In this embodiment, the signal input of the warning device is controlled not only by the switch SW20 but also by an additional normally closed switch SW23 arranged in parallel with switch SW20 to cooperate with the common cam lobe 3a. This switch SW23 is connected in the place of the switch SW20 of FIG. 4, and the replaced switch SW20 is connected in series between the switch SW21 and the signal processor 11. The construction and arrangement of the parts other than these switches SW20 and SW23 are the same as those of FIG. 5. In other words, while the embodiment of FIGS. 1 to 5 is to stop the driving of the camera in response to the change from the ordinary zoom to the macro-zoom range, the second embodiment has an additional function of cutting off the current from supply to the signal processor to render inoperative the autofocusing device. This situation is also displayed by the warning device.

While the foregoing description and drawings represent the preferred embodiments of the present invention, it will be obvious to those skilled in the art that various changes and modifications may be made therein without departing from the true spirit and scope of the present invention.

What is claimed is:

1. A camera comprising:
   (a) a zoom lens mechanical mounting capable of selectively photographing in an ordinary zoom range and a macro-zoom range;
   (b) photographing range changeover means for changing over said zoom range of said zoom lens mechanical mounting;
   (c) automatic focus adjustment means for automatically controlling focus adjustment of said zoom lens in accordance with a distance from said camera to an object to be photographed, said means having:
   a distance measuring optical system having an optical axis offset from that of said zoom lens; and
   a focus adjusting device for detecting the camera-to-object distance by an incident light beam from said distance measuring optical system and for performing focus adjustment of said zoom lens;
   (d) drive means for driving said camera; and
   (e) control means responsive to changeover operation by said changeover means to said macro-zoom range for causing said drive means to be inoperative.

2. A camera according to claim 1, wherein said zoom lens mechanical mounting has a focusing lens optical system operatively connected to said focus adjustment device.

3. A camera according to claim 1, wherein said zoom lens includes a zoom lens control optical system and a focusing lens optical system.

4. A camera according to claim 1, wherein said changeover means is capable of zooming operation in said ordinary zoom range when said zoom lens mechanical mounting is changed to the ordinary zoom range.

5. A camera according to claim 1, wherein said control device has a display means for indicating that said drive means is rendered inoperative by the changeover operation of said changeover means to said macro-zoom range.

6. A camera according to claim 5, wherein said display means has a display portion positioned in a finder.

7. A camera according to claim 1, wherein said zoom lens includes a focusing optical system and a zoom lens optical system.

8. A camera comprising:
   (a) a zoom lens mechanical mounting capable of selectively photographing in an ordinary zoom range and a macro-zoom range;
   (b) photographing range changeover means for changing over said zoom range of said zoom lens mechanical mounting;
   (c) automatic focus adjustment means for detecting a distance from the camera to an object to be photographed and for automatically performing focus adjustment of said zoom lens, said means having:
   a distance measuring optical system having an optical axis offset from that of said zoom lens; and
   focus adjustment means for detecting the camera-to-object distance by an incident light beam from said distance measuring optical system and for performing the focus adjustment of said zoom lens; and (d) control means responsive to the changeover operation of said changeover means to said macro-zoom range for operatively excluding said automatic focus adjustment means.

9. A camera according to claim 8, wherein said zoom lens mechanical mounting has a focusing lens optical system operatively connected to said focus adjustment means.

10. A camera according to claim 8, wherein said changeover means is capable of zooming operation when said zoom lens mechanical mounting is changed to said ordinary zoom range and of focusing operation when changed to said macro-zoom range.

11. A camera according to claim 8, wherein said control means has a display means for indicating that said automatic focus adjustment device is excluded by the changeover operation of said changeover means to the macro-zoom range.

12. A camera according to claim 11, wherein said display means has a display portion positioned in a finder.

13. A camera comprising:
(a) a zoom lens mechanical mounting capable of selectively photographing in an ordinary zoom range and a macro-zoom range;
(b) photographing range changeover means for changing over said zoom range of said zoom lens mechanical mounting;
(c) automatic focus adjustment means for automatically controlling focus adjustment of said zoom lens in accordance with a distance from said camera to an object to be photographed, said means having:
a distance measuring optical system having an optical axis offset from that of said zoom lens; and
a focus adjusting device for detecting the camera-to-object distance by an incident light beam from said distance measuring optical system and for performing focus adjustment of said zoom lens;
(d) drive means for driving the camera;
(e) control means responsive to the changeover operation of said photographing range changeover means to the macro-zoom range for causing said drive means to be inoperative; and
(f) automatic and manual focusing adjustment changeover means for selectively excluding said automatic focusing adjustment means from being engageble in the manual focusing operation of said zoom lens mechanical mounting; said changeover means when set in the manual focusing adjustment mode always causing said drive means to be operative regardless of said photographing range changeover means.

14. A camera according to claim 13, wherein said zoom lens includes a zoom control optical system and a focusing lens optical system.

15. A camera accordint to claim 13, wherein said zoom lens mechanical mounting has a focusing lens optical system operatively connected to said focusing adjustment device.

16. A camera according to claim 13, wherein said photographing range changeover means is capable of zooming operation in the ordinary zoom range when said zoom lens mechanical mounting is changed to the ordinary zoom range.

17. A camera according to claim 13, wherein said photographing range changeover means is capable of focusing operation when said zoom lens mechanical mounting is changed to the macro-zoom range.

18. A camera according to claim 13, wherein said zoom lens mechanical mounting has a manually operable focusing control means.

19. A camera according to claim 13, wherein said focus adjustment device has at least a motor for causing focus adjustment to be performed, and said automatic and manual focusing adjustment changeover device has a switching means for automatically cutting off electrical current from said motor when set to the manual focusing adjustment mode.

20. A camera comprising:
(a) a zoom lens mechanical mounting capable of selectively photographing in an ordinary zoom range and a macro-zoom range, said mounting having:
a stationary lens barrel having an elongated slot including a portion for the ordinary zoom range and a portion for the macro-zoom range contiguous to said ordinary zoom range slot portion;
a focusing sleeve rotatably mounted on said stationary lens barrel and having a focusing lens system, so that, upon rotation of said sleeve, axial movement is effected for focusing; and
a zoom control sleeve, at least a portion of which is rotatably fitted in said stationary lens barrel, so that, upon rotation axial movement of a zoom control member is effected for zooming, said zoom control sleeve having indicating means for indicating that said zoom control lens member is changed from the ordinary zoom range to the macro-zoom range;
(b) photographing range changeover means extending from said zoom control sleeve through and outwardly beyond said elongated slot of said stationary lens barrel, said means being displaced in guidance by said elongated slot to control said rotation of said zoom control sleeve from the outside of said zoom lens mechanical mounting;
(c) automatic focus adjustment means for detecting a distance from the camera to an object to be photographed and for automatically controlling focus adjustment of said zoom lens, said means having:
distance measuring optical system having an optical axis offset from that of said zoom lens;
distance signal forming means responsive to the light from said distance measuring optical system for producing a signal representative of the camera-to-object distance; and
adjusting means responsive to the output signal of said signal forming means for adjustment of the angular position of said focusing sleeve to effect focusing, said adjusting means having a motor operatively connected to said focusing sleeve;
(d) drive means for driving the camera;
(e) control means for causing said drive means to be inoperative in cooperation with said indicating means of said zoom control sleeve when said photographing range changeover means is displaced from the slot portion for the ordinary zoom range of said stationary lens barrel to the slot portion for the macro-zoom range; and
(f) automatic and manual focusing adjustment changeover means for selectively excluding said automatic focus adjustment means to cause said zoom lens mechanical mounting to be manually operative for focusing, said changeover means when set in the manual focusing mode causing said drive means to be always operative regardless of said photographing range changeover means.

21. A camera according to claim 20, wherein said control means has a switch means connected between said drive means and an electrical power source and arranged to be controlled by said indicating means.

22. A camera according to claim 21, wherein said indicating means is formed as a projection extending from the outer periphery of said zoom control sleeve, and said switch means has a switch device of the normally closed type which is arranged to be opened by said projection.

23. A camera according to claim 22, wherein said control means has a display means for indicating that said drive means is caused to be inoperative by the changeover operation of said photographing range changeover means to the macro-zoom range, said display means being electrically coupled to said switch device.

24. A camera according to claim 23, wherein said display means has a display lamp positioned in a finder upon energization to be lighted on and a switching means responsive to the opening of said switch device for conducting to effect the energization of the display lamp.

25. A camera according to claim 24, wherein said switching means has a switching transistor.

26. A camera according to claim 20, wherein said slot portion for the ordinary zoom range is stepped from said slot portion for the macro-zoom range so that in moving said photographing range changeover means from the ordinary zoom range to the macro-zoom range, only one stroke of a lifting upon operation is required.

27. A camera comprising:
(a) a zoom lens mechanical mounting capable of selectively photographing in an ordinary zoom range and a macro-zoom range, said mounting having:
   a stationary lens barrel having an elongated slot consisting of a portion for the ordinary zoom range and a portion for the macro-zoom range contiguous to said ordinary zoom range slot portion;
   a focusing sleeve rotatably mounted on said stationary lens barrel and having a focusing lens system, so that, upon rotation of said sleeve, axial movement is effected for focusing; and
   a zoom control sleeve at least a portion of which is rotatably fitted in said stationary lens barrel, so that, upon rotation, axial movement of a zoom control member of said zoom lens is effected for zooming and having indicating means for indicating that said zoom control lens member is changed from the ordinary zoom range to the macro-zoom range;
(b) photographing range changeover means extending from said zoom control sleeve through and outwardly beyond said elongated slot of said stationary lens barrel, said means being displaced in guidance by said elongated slot to control said rotation of said zoom control sleeve from the outside of said zoom lens mechanical mounting;
(c) automatic focus adjustment means for detecting a distance from the camera to an object to be photographed and for automatically controlling focus adjustment of said zoom lens, said means having:
   distance measuring optical system having an optical axis offset from that of said zoom lens;
   distance signal forming means responsive to the light from said distance measuring optical system for producing a signal representative of the camera-to-object distance; and
   adjusting means responsive to the output signal of said signal forming means for adjustment of the angular position of said focusing sleeve to effect focusing, said adjusting means having a motor operatively connected to said focusing sleeve;
(d) drive means for driving the camera; and
(e) control means for causing said automatic focus adjustment means to be inoperative in cooperation with said indicating means of said zoom control sleeve when said photographing range changeover means is displaced from the slot portion for the ordinary zoom range of said stationary lens barrel to the slot portion for the macro-zoom range.

28. A camera according to claim 27, wherein said control means has a switch means connected between said drive means and an electrical power source and arranged to be controlled by said indicating means.

29. A camera according to claim 28, wherein said indicating means is formed as a projection extending from the outer periphery of said zoom control sleeve, and said switch means has a switch device of the normally closed type arranged to be opened by said projection.

30. A camera according to claim 29, wherein said control means has a display means for indicating that said drive means is rendered inoperative by the changeover operation of said photographing range changeover means to the macro-zoom range, said display means being electrically connected to said switch device.

31. A camera according to claim 30, wherein said display means has a display lamp positioned in a finder to be lighted upon energization and a switching means responsive to the opening of said switch device for effecting the energization of the display lamp.

32. A camera according to claim 31, wherein said switching means has a switching transistor.

33. A camera according to claim 27, wherein said slot portion for the ordinary zoom range is stepped from said slot portion for the macro-zoom range so that in moving said photographing range changeover means from the ordinary zoom range to the macro-zoom range, only one stroke of a lifting up operation is required.

* * * * *